United States Patent
Eriksson et al.

(10) Patent No.: US 10,836,334 B2
(45) Date of Patent: Nov. 17, 2020

(54) CRASH MANAGEMENT SYSTEM

(71) Applicant: Ningbo Geely Automobile Research & Development Co., Ltd., Ningbo (CN)

(72) Inventors: Emil Eriksson, Stenkullen (SE); Oskar Ewehag, Gothenburg (SE)

(73) Assignee: CHINA-EURO VEHICLE TECHNOLOGY AB, Gothenburg (SE)

(*) Notice: Subject to any disclaimer, the term of this patent is extended or adjusted under 35 U.S.C. 154(b) by 1 day.

(21) Appl. No.: 16/296,119

(22) Filed: Mar. 7, 2019

(65) Prior Publication Data

US 2019/0232905 A1    Aug. 1, 2019

Related U.S. Application Data

(63) Continuation of application No. PCT/CN2017/102977, filed on Sep. 22, 2017.

(30) Foreign Application Priority Data

Sep. 30, 2016   (EP) .................................. 16191879

(51) Int. Cl.
*B60R 19/34* (2006.01)
*B60R 21/013* (2006.01)
*B62D 21/15* (2006.01)

(52) U.S. Cl.
CPC ............ *B60R 19/34* (2013.01); *B60R 21/013* (2013.01); *B62D 21/15* (2013.01)

(58) Field of Classification Search
CPC ...................................................... B60R 19/34
USPC ............................................... 293/132, 133
See application file for complete search history.

(56) References Cited

U.S. PATENT DOCUMENTS

| | | | |
|---|---|---|---|
| 5,056,840 A | 10/1991 | Eipper | |
| 10,232,811 B2* | 3/2019 | Williams | ............... B60R 19/34 |
| 2003/0178861 A1* | 9/2003 | Wikstrom | ............... B60R 19/34 |
| | | | 293/133 |
| 2005/0253403 A1 | 11/2005 | Longo | |
| 2016/0176374 A1 | 6/2016 | Freienstein | |

FOREIGN PATENT DOCUMENTS

| | | |
|---|---|---|
| CN | 104724175 A | 6/2015 |
| CN | 105026217 A | 11/2015 |
| CN | 105102276 A | 11/2015 |
| DE | 19931981 A1 | 12/1999 |
| DE | 10 2013 214302 A1 | 1/2015 |
| JP | 2006224721 A | 8/2006 |

OTHER PUBLICATIONS

International Search Report and Written Opinion from corresponding International Patent Application No. PCT/CN2017/102977, dated Jan. 3, 2018; 7 pages.
Extended European Search Report from corresponding European Patent Application No. 16191879.2, dated Feb. 23, 2017, 7 pages.

* cited by examiner

*Primary Examiner* — Joseph D. Pape
(74) *Attorney, Agent, or Firm* — Tucker Ellis LLP

(57) ABSTRACT

The present invention relates to a crash management system adapted for use in a vehicle. The crash management system includes a bumper beam and at least two crash boxes. Each crash box extends from the bumper beam and is provided with deformation indication means adapted for static indication of crash box deformation caused by a vehicle crash. The present invention also relates to a method for detecting crash box deformation by means of the crash management system.

8 Claims, 3 Drawing Sheets

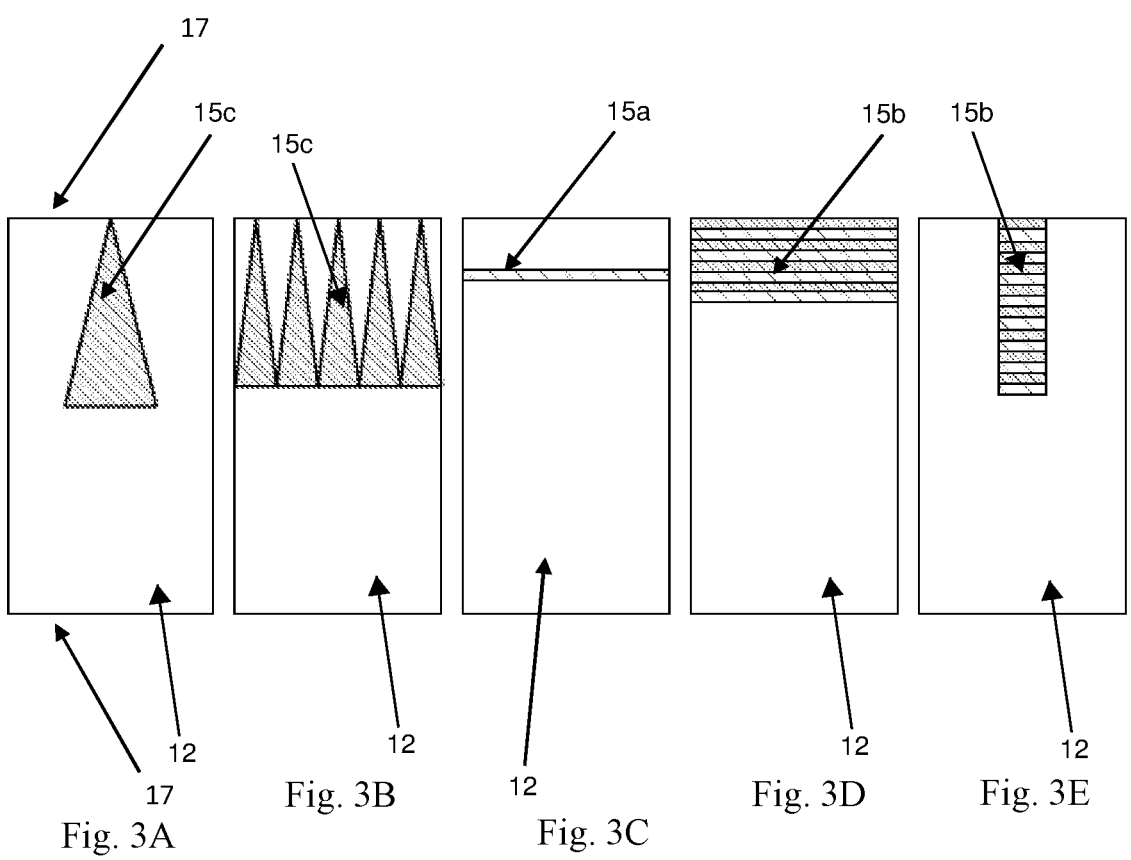

CRASH MANAGEMENT SYSTEM

FIELD OF THE INVENTION

The present invention relates to a crash management system for use in a vehicle wherein the crash management system comprises a bumper beam and at least two crash boxes. Further, the present invention relates to a method of detecting crash box deformation caused by a vehicle crash by means of said crash management system.

BACKGROUND OF THE INVENTION

The Body in White (BIW) is referred to as the assembly of frames and panels made up of homogeneous materials working as main structure of a vehicle. The BIW is important both from safety and environmental perspectives. All structural components have stiffness and strength requirements but only some of them also have energy absorbing requirements—the Crash Management System (CMS) is one of those. The CMS is part of the crash zone where impact energy is to be absorbed during crash. The CMS usually consists of at least three main types of components: the bumper beam, two crash boxes, and connection plates against the body structure.

The automotive industry is continuously searching for means and materials to reduce weight. In relation to the CMS there is also the aspect of safety to take into consideration. A good vehicle bumper beam should be attached to the vehicle body via energy absorbing structures that are inexpensive to repair or replace. The crash box therefore has an essential function. There are two general modes of energy absorption through slender absorbing elements, one is progressive folding which is used extensively in the automotive industry today and one is progressive crushing shown by brittle materials such as composites.

The crash boxes typically have an oblong shape and are arranged symmetrically at longitudinally opposite ends of the bumper beam. Problems associated with prior art crash boxes include difficulty to assess the state of the crash boxes, from safety, insurance, and maintenance perspectives, after a low speed crash.

SUMMARY OF THE INVENTION

The inventors have realized that, in particular for composite crash boxes that crush progressively, it may be difficult to determine the state of the crash boxes. It is of importance to detect whether the components of the CMS have been affected or damaged, and therefore need replacing. In a worst case scenario, the trigger function of the crash box has been consumed in a previous, low speed crash. As a result thereof, the crash box may fail catastrophically, instead of progressively, in a subsequent crash, which significantly impairs the energy absorbing function of the crash box and CMS.

On this background, it is an object of the present invention to provide a crash management system which facilitates easy determination of whether it has been subjected to, and damaged in, a crash.

This object is achieved by providing a crash management system adapted for use in a vehicle wherein the crash management system comprises a bumper beam and at least two crash boxes and wherein each crash box extends from the bumper beam and is provided with deformation indication means, wherein the deformation indication means is adapted for static indication of crash box deformation caused by a vehicle crash. The invention provides a simple, inexpensive built in tool, facilitating fast and simple analysis of the state of the crash box. In addition, the required cost and time of said analysis is reduced. The deformation indication means may additionally form an integrated part of the crash box at the stage of production and include all necessary means for conducting said analysis.

According to aspects of the invention, the deformation indication means is adapted for indicating crashes occurring at speeds below 15 km/h, preferably at speeds between 5-10 km/h. Even small damages to the crash box, such as those from low speed crashes, may be easily detected.

According to further aspects of the invention the deformation indication means is visual and/or tactile means. The crash analysis of the crash box is thereby simplified, requiring a minimum of tools for conducting a crash box analysis to determine deformation of the crash box.

According to still further aspects of the invention the deformation indication means extends circumferentially and/or longitudinally on an external surface of the crash box. Thereby, the deformation indication means according to the present invention does not comprise invasive means which could affect or compromise the structural integrity of the crash box.

According to aspects of the invention the deformation indication means comprises paint, tape, protrusions, and/or cavities. Hence, the deformation indication means may be provided easily, cheaply, and securely on the crash box.

According to aspects of the invention the deformation indication means comprises at least one line extending circumferentially on the crash box, all points of each line being arranged equidistantly from an end of the crash box. By means of the circumferential line, the deformation indication means may indicate crash/crush at any location along a rim of the crash box such that information regarding the angle of the crash may be indicated, i.e. the deformation indication means is not limited to indicate uniform crushing of the crash box.

According to aspects of the invention the deformation indication means comprises at least one scale extending longitudinally along the crash box from an end of the crash box. The deformation indication means may thereby form an integral part of the crash box, e.g., at the stage of production and include all means necessary for conducting a crash box analysis.

According to aspects of the invention the deformation indication means comprises at least one triangular marking extending longitudinally along the crash box from an end of the crash box, the apex of the triangle being arranged at an end of the crash box. The deformation indication means may thereby very easily and clearly indicate deformation, even without making measurements.

According to aspects of the invention the deformation indication means further comprises a flexible foil extending longitudinally along the crash box. The crash box is thereby provided with yet another indication of deformation, making the detection even more reliable.

In a further aspect the invention relates to a method of detecting crash box deformation caused by a vehicle crash by means of the crash management system described above, the method comprising the steps of:

a) registering the location of two individual points on at least one crash box, a first point being arranged on the deformation indication means, a second point being arranged at an end of the crash box, b) determining the location of the second point in relation to the first point, c) determining if the current location of the second point is different from a previously determined location of the second point, whereby, if the second point has moved, deformation has been detected.

According to further aspects the step b) comprises measuring the distance between the first and second points.

According to still further aspects, the step b) comprises reading the first and second points on a scale.

According to further aspects the method further comprises the step of: d) measuring a distance between first and second points on a second crash box, and e) comparing the distance measured in step b) to the distance measured in step d), whereby, if the distances are not identical, deformation has been detected.

According to further aspects the method further comprises the step of:

f) visually detecting deformation of a flexible foil extending longitudinally along the crash box.

Further objects, features, advantages and properties of the crash box indicator and method according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIGS. 3A-3E are diagrammatic depictions of deformation indication means according to the different embodiments of the present invention.

DETAILED DESCRIPTION OF THE INVENTION

In the following detailed description, the crash management system according to the present invention will be described by the preferred embodiments.

The construction and operation of a crash management system is as such well-known and should not require further explanation in the present context. Further details regarding the operation of the specific crash management system according to the invention are provided below.

Figure 1:
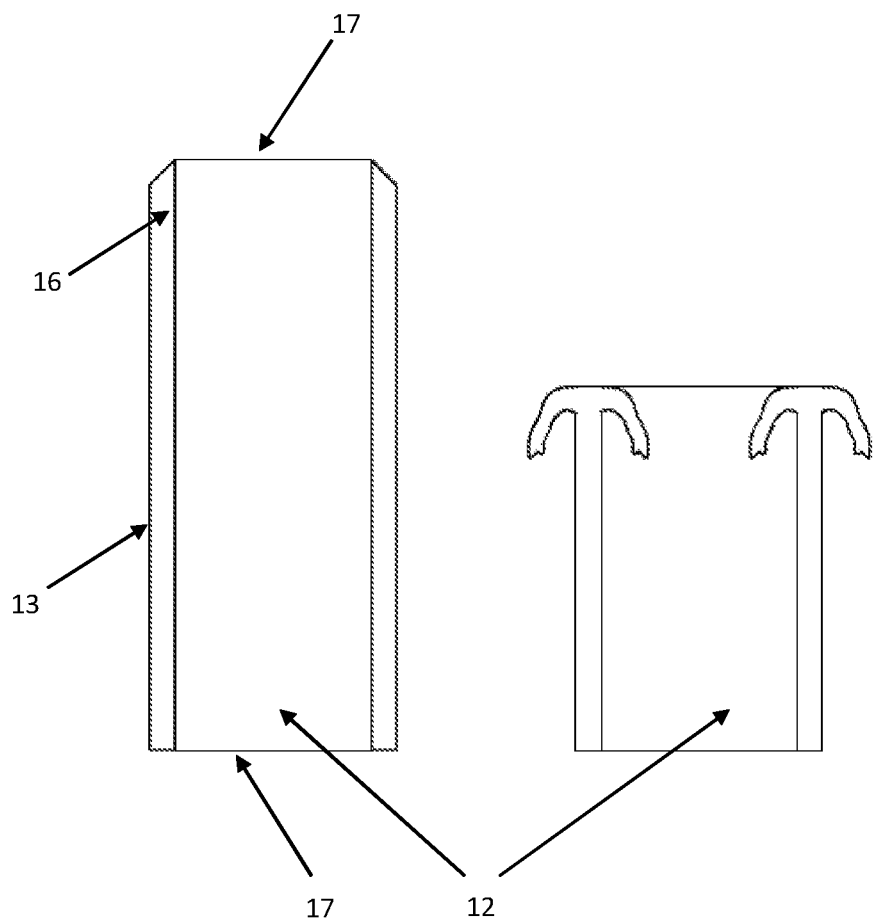
FIG. 1 is a diagrammatic depiction of progressive crushing of a crash box.

The principal destruction of a composite crash box due to compressive failure is illustrated in FIG. 1. As the crash box is subjected to an external compressing force, such as that arising when a vehicle crashes into a stationary object, the forces are absorbed through the crushing of the composite.

Figure 2:
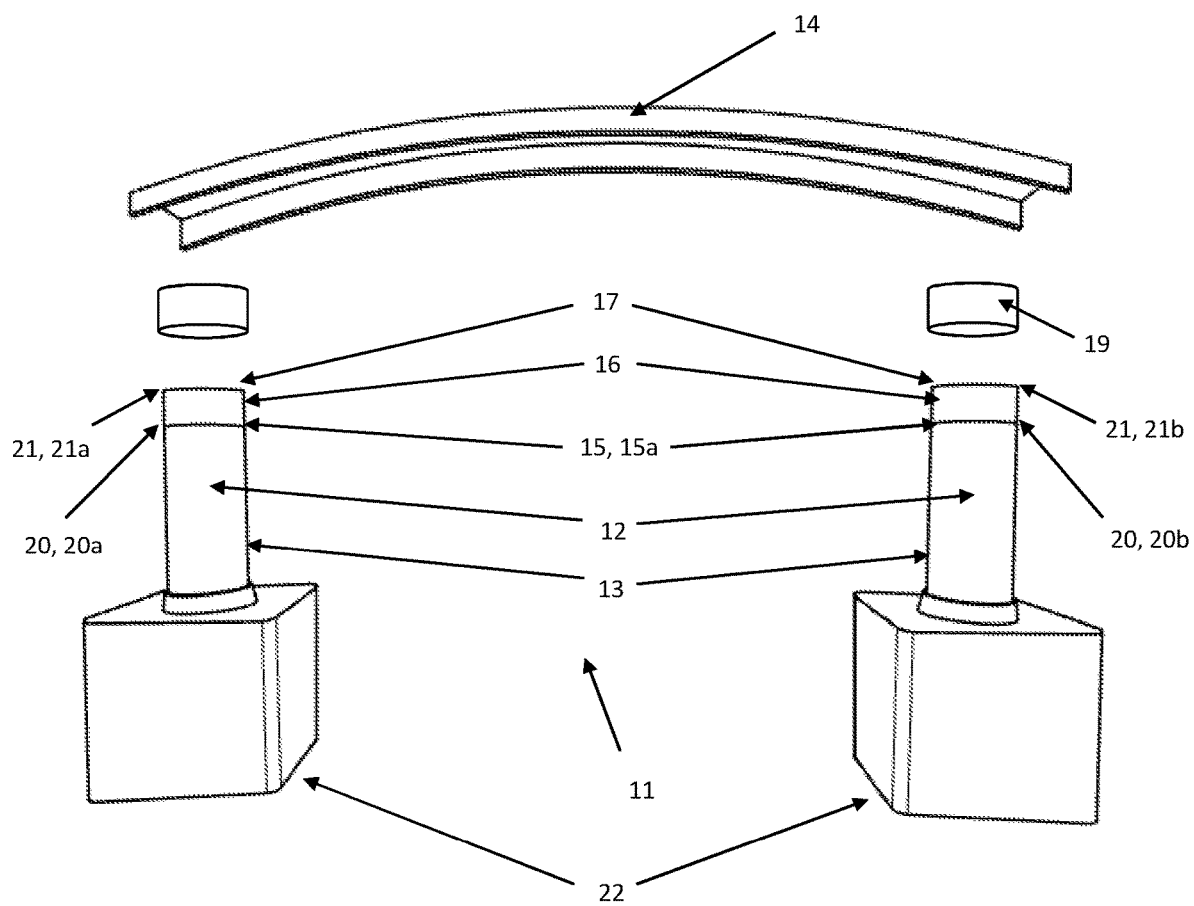
FIG. 2 is an exploded view of a crash management system according to one embodiment of the present invention.

FIG. 2 shows a first exemplary embodiment of the crash management system 11 according to one aspect of the invention, which is particularly suitable for crash boxes 12 comprising composite materials. The crash management system 11 may typically comprise a bumper beam 14 and at least two crash boxes 12, where each crash box 12 may extend between the bumper beam 14 and the vehicle structure 22, schematically shown as boxes 22, such that external forces, which the bumper beam 14 is subjected to, are transferred to the two crash boxes 12 via the rim 16 of the crash box 12.

At least one interface module 19 may be arranged between each of the crash boxes 12 and the bumper beam 14. The interface module 19 facilitates transition of force and attachment of the crash box 12 to the bumper beam 14. The interface module 19 may comprise at least one holder for the crash box where glue can be applied. The interface module 19 may be manufactured integrally with the bumper beam 14, or as separate parts attached to the bumper beam 14. The beam 14 and the interface module 19 may comprise of the same, or different, materials.

The crash boxes 12 of the crash management system 11 depicted in FIG. 2 are provided with deformation indication means 15. The deformation indication means 15 may be provided as different variants, including but not limited to foil, painted line, strips of self-adhesive tape, protrusions, or cavities.

The deformation indication means 15 may be provided on an external surface 13 on the crash box 12 and extend longitudinally and/or circumferentially along the crash box 12. FIGS. 3A-3E show a number of embodiments of the deformation indication means 15.

The deformation indication means 15 may be arranged at the very end 17 of the crash box 12, or farther towards the centre of the crash box 12, preferably the first part of a crash box 12 which is visible when the crash box is mounted to a bumper beam 14, i.e. the first part of the crash box 12 which is not covered by an interface module 19.

The deformation indication means 15 may be formed as one or several lines extending along the circumference of the crash box 12, see FIGS. 3C-3E. All points on each line are arranged equidistantly from one end 17 of the crash box, preferably the end adjacent the bumper beam 14. E.g., said line may be arranged either along the very end 17 of the crash box or at a specified distance, such as 4 centimeters, from the end 17. There may be several deformation indication means 15 extending along the circumference of the crash box 12, distributed along a longitudinal length of the crash box 12, such as to form a scale 15b. See FIGS. 3D-3E.

As mentioned, the crash box indicator may 15 comprise one line 15a in which all points are arranged equidistantly from the outer end 17 of the crash box 12 such that the deformation indication means 15 may indicate crash/crush at any location along the rim 16 of the crash box 12. See FIG. 3C.

By equidistantly is meant that corresponding points on a line, preferably the points making up one outer edge of the line, are arranged at the same distance from the end 17 of the crash box 12. Further, the width of the line is adapted such that the line is easy to detect, while it still being possible to detect small deformation of the crash box 12. E.g., the width is preferably less than 5 cm, more preferably under 1 cm, and most preferably below 0.5 cm.

The deformation indication means 15 may further comprise a readable scale 15b facilitating easy reading of the distance between a point on the deformation indication means 15 and a point on the crash box, preferably the end of the crash box 12. The scale 15b may be arranged longitudinally along the crash box 12 from an end 17 of the crash box 12. As mentioned above, the deformation indication means may comprise of several circumferential lines forming such a scale. However, the scale may also extend longitudinally as a line along the crash box, indicating a scale by means of numbering or other marking. See FIGS. 3D-3E.

The deformation indication means 15 may also comprise one or several triangles 15c extending longitudinally along the crash box 12 from one end 17 of the crash box. The apex of the triangle 15c is arranged at the very end 17 of the crash box 12 or farther towards the centre of the crash box 12, preferably on the first part of a crash box 12 which is visible when the crash box is mounted to a bumper beam 14, i.e. the first part of the crash box 12 which is not covered by an interface module 19. The base of the triangle is arranged closer to the centre of the crash box 12, seen longitudinally. When affected by crash, the apex will no longer be visible since the triangle will become truncated as the crash box 12 is crushed. Hence, deformation is indicated. See FIGS. 3A-3B.

The invention thereby achieves that the deformation indication means 15 are adapted for static indication of crash box deformation. The indication may be referred to as static in the sense that the deformation indication means is stationary arranged on the crash box. The indication of crash box deformation is additionally directly visible by means of ocular inspection, including measuring a distance from the deformation indication means to a second point, e.g. the outer end 17 of the crash box. The measurement can be conducted with an analogue or digital measurement tool or by means of viewing the scale 15b or triangle 15c without any further need for tools or sensors.

The deformation indication means 15 is further passive while it is capable of indicating a crash absent any active means such as electrical current, light, sensors, or other means which are subjected to change in case of a crash in order to be able to indicate a crash.

The crash box 12/crash box external surface 13 may further be provided with a flexible foil 18 such as an aramid layer, or a thin metallic sheet attached to the surface of the crash box, which folds/buckles, rather than crushes, when subjected to compressive forces, such that the flexible foil 18 directly, visually, and/or tactilely, indicates if the crash box 12 has been subjected to, and damaged in, a crash.

In order to accommodate the demand for deformation indication means which indicate limited crushing due, e.g., to a light crash such as typically is the case of parking collisions, it has been contemplated that the deformation indication means may be adapted for indicating only low speed crashes, i.e. crashes occurring at speeds below 15 km/h, preferably between 5-10 km/h.

In some aspects, the crash box indicator 15 of the crash management system 11 may further comprise tactile means such as a milled/routed slot, a protruding edge, or one or more protruding dots, or cavities.

Aspects of the invention further include a method of detecting crash box deformation caused by a vehicle crash by means of the crash management system 11. The method may include but is not limited to comprise the following steps nor in the prescribed order:

A first step involves the registering of the location of two individual points on the crash box. The first point 20 is arranged on the deformation indication means, e.g., the circumferential line 15a if the deformation indication means 15 is a painted line or the like. The second step involves registering of the location of a second point 21 which is located at an end 17 of the crash box 12, either the end adjacent the bumper or the opposite end adjacent the vehicle body. Provided the location of the two points being registered, the location of the second point 21 in relation to the first point 20 may be determined in a subsequent step. This step may comprise measuring the distance between said first 20 and second 21 points on the crash box 12.

The first two steps may preferably be carried out during manufacture of a crash box 12 or the distance may be a predetermined value allowed by the tolerances of the said manufacturing process. In the event that there is a need to investigate whether the crash management system 11 has been subjected to a crash, which may have caused compression and crushing of any one of the crash boxes 12, then the method comprises a third step which includes the determining of whether the location of the second point 21 has moved in relation to the previously determined location. This step may comprise comparing a distance, measured between said first 20 and second points 21, to the previously measured distance or a predetermined value, measured between the same first 20 and second points 21.

If the second point 21 has moved in relation to the previously determined location, or if the determined value differs from a predetermined value, this is an indication that deformation has been detected. Upon determining and registering the location of the first 20 and second 21 points in relation to each other, at least the first point 20 will provide direct visual indication of its location, which location remains stationary/static prior to and after a crash. If the deformation indication means comprises a scale 15b or at least one triangle 15c, then additionally the second point 21 will also provide passive direct visual indication of crash.

The step which includes the registering of the location of the first point 20 and second point 21 may include reading the first and second points 20, 21 on the scale 15b. By reading the points 20, 21 of the scale 15b, the method facilitates that information relating to the magnitude and the direction of the crash may be obtained by direct visual indication by means of the scale 15b.

The method may comprise a fourth step comprising comparing a first distance, measured between a first 20a and a second point 21a on a first crash box 12, to a second distance, measured between a first 20b and a second point 21b on a second crash box 12.

The method may be combined with any aspect of the crash management system 11 such that, for example, it includes yet another step comprising visually detecting deformation of a flexible foil arranged longitudinally along the crash box 12.

In the method according to the invention, the second point 21 may be arranged at the end of the crash box 12 at/on the rim of the crash box 12, which is connected to the bumper beam 14. However, the second point 21 may be arranged at the opposite end of the crash box 12, which is connected to the body of the vehicle. Further, one or several variants of the deformation indication means, as shown in FIGS. 3A-3E, may be combined on one crash box 12.

The crash box 12 may comprise various shapes comprised by the art and in a non-limiting example the crash box 12 may be shaped as a parallelepiped or a cylinder, and the distance between first and second points is measured longitudinally on the crash box 12, i.e. in the longitudinal direction of the vehicle.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality. The single processor or other unit may fulfill the functions of several means recited in the claims.

NOMENCLATURE

11 Crash management system
12 Crash box

13 Crash box external surface
14 Bumper beam
15 Deformation indication means
15a Line
15b Scale
15c Triangle
16 Rim
17 End of crash box
18 Flexible foil
19 Interface module
20 First measurement point
20a First measurement point, first crash box
20b First measurement point, second crash box
21 Second measurement point
21a Second measurement point, first crash box
21b Second measurement point, second crash box
22 Vehicle structure

The invention claimed is:

1. A crash management system adapted for use in a vehicle,
said crash management system comprising a bumper beam and at least two crash boxes,
each crash box extending from said bumper beam and being provided with deformation indication means,
wherein said deformation indication means is adapted for static indication of crash box deformation caused by a vehicle crash, and
wherein said deformation indication means comprises at least one scale extending longitudinally along said crash box from an end of said crash box.

2. The crash management system according to claim 1, wherein said deformation indication means is adapted for indicating crashes occurring at speeds below 15 km/h.

3. The crash management system according to claim 1, wherein said deformation indication means is visual and/or tactile means.

4. The crash management system according to claim 1, wherein said deformation indication means extends longitudinally on an external surface of each crash box.

5. The crash management system according to claim 4, wherein said deformation indication means comprises paint, tape, protrusions, and/or cavities.

6. The crash management system according to claim 1, wherein said deformation indication means further comprises at least one line extending circumferentially on each crash box, all points of each line being arranged equidistantly from an end of each crash box.

7. A crash management system adapted for use in a vehicle,
said crash management system comprising a bumper beam and at least two crash boxes,
each crash box extending from said bumper beam and being provided with deformation indication means,
wherein said deformation indication means is adapted for static indication of crash box deformation caused by a vehicle crash, and
wherein said deformation indication means comprises at least one triangular marking extending longitudinally along said crash box from an end of said crash box, an apex of said triangle being arranged at an end of said crash box.

8. A crash management system adapted for use in a vehicle,
said crash management system comprising a bumper beam and at least two crash boxes,
each crash box extending from said bumper beam and being provided with deformation indication means,
wherein said deformation indication means is adapted for static indication of crash box deformation caused by a vehicle crash,
wherein said deformation indication means extends circumferentially and/or longitudinally on an external surface of said crash box,
wherein said deformation indication means comprises paint, tape, protrusions, and/or cavities, and
wherein said deformation indication means further comprises a flexible foil extending longitudinally along said crash box.

* * * * *